Patented Apr. 7, 1942

2,278,515

UNITED STATES PATENT OFFICE 2,278,515

LAMINATED FILM PROTECTED SURFACE

Donald L. Gibb and Albert B. Savage, Midland, Mich., assignors to The Dow Chemical Company, Midland, Mich., a corporation of Michigan No Drawing. Application May 10, 1939, Serial No. 272,794

3 Claims. (Cl. 154—2)

This invention relates to an improved composite transparent film which is relatively hard and heat and abrasion resistant on one face, the other face of which is capable of uniting with the surface of wood, paper and other materials on application of only moderate heat and pressure.

Composite films which are adapted to be adhesively united with the surface of articles by application of heat and pressure are well known to the art. They have been used to give protective, decorative and electrical insulating surface layers to objects formed of wood, metal, paper and the like. Some of these composite foils consist of a layer of transparent cellulose ester carrying an adherent layer of a plasticized cellulose ester composition. Thus, Mijnssen describes, in U. S. Patent No. 1,005,454, a cellulose acetate film made up of layers of plasticized and unplasticized ester, which he states is useful for electrical insulating purposes.

As a result of experiments on the adhesive properties of celluose ester films such as those just described, we have found their application to have certain limitations. The strength and uniformity of the bond between any given plasticized cellulose derivative layer and the surface of another material depends greatly on the nature of the latter, besides on the degree of heat and pressure applied. Thus, fibrous materials such as unsized, plain paper provide surfaces to which a wide range of plastic compositions will unite. An adhesive with only a small degree of flow is required in order that it may bond with the numerous free surface fibers. On this account, any composition which is in a small degree thermoplastic under practical pressure, at temperatures below those at which the paper becomes damaged, can be used as an adhesive for unsized paper. A problem arises, however, in the case of laminations with heavily printed sized paper such as half-tone or rotogravure prints. Here, the bond to the printing ink is weak and firm adherence appears to depend on the ability of the adhesive to flow down between the ink coated areas and contact the comparatively few exposed unprinted paper fibers. Also, the means of attaining a sufficient degree of flow are limited by the fact that the application of undue degrees of heat and pressure to such articles is likely to cause physical damage to the paper or bleeding or smudging of the ink. A composition which becomes adhesive at only moderate temperatures and pressures is needed.

An object of our invention, therefore, is the preparation of a composite film, one side of which possesses adhesive qualities at temperatures above about 75° C. and at low pressures, but which is non-tacky and non-adhesive at room temperatures, the other side of which remains hard and non-tacky under these conditions.

A more specific object is the preparation of a unitary transparent composite film suitable for surfacing printed photographic reproductions and which will give to them a relatively marproof surface and an appearance simulating that of true photographs.

Another object is the production of such surfaced photographic reproductions. Further objects will become apparent in the following.

We have found that these objects are attained by forming a composite film made up of a thin base film of ethyl cellulose to which is united a layer of a plasticized composition containing ethyl cellulose of low viscosity and of ethoxy value higher than about 46.5 per cent. A composite film of this nature, comprising a non-tacky lamina containing 25–50 per cent plasticizer possesses good adhesive properties at temperatures above 75° C. and below 150° C. under moderate pressures. The unplasticized ethyl cellulose lamina does not flow under these conditions.

Ethyl cellulose, of ethoxyl value 46.5–49.5 per cent, whose 5 per cent solution in 80:20 toluene-ethanol has a viscosity below 25 centipoises, is the most suitable cellulose derivative for use in the plasticized lamina on account of its initial softness and high flow properties, and on account of its compatibility with a large range of plasticizers and plasticizing resins. The latter property has enabled the selection of plasticizers and resins which, when incorporated with low viscosity, high ethoxy ethyl cellulose in amount less than that giving tackiness or unduly reduced tensile strength, are yet capable of imparting flow properties sufficient to make it adhere to printed photographic reproductions on the application of pressure below 150 lbs./sq. in. at temperatures between about 75° and 150° C. The suitability of any given plasticized ethyl cellulose composition for use in making the composite films of the invention may be determined using the Bakelite-Olsen Flow Tester. Compositions with a rate of flow of greater than about 0.02 inch in 10 seconds as measured by this apparatus at 125° C. and under 740 lbs./sq. in. have been found to give good adhesion to printed paper under the aforesaid conditions.

The plasticized low viscosity, high ethoxy type ethyl cellulose compositions having the above range of flow properties satisfy the objects of our invention, but for use in certain modes of practice, compositions having narrower ranges of properties lying within this broad range are necessary for best results. Thus, with laminating equipment employing pressures of 20–80 lbs./sq. in. at about 125° C., composite foils having one side comprising compositions which give rates of flow in the Bakelite-Olsen Flow Tester of about 0.1 to 0.3 inch are suitable. Good laminations to heavily printed paper are obtained using pressures of 10–20 lbs./sq. in. when the adhesive coating composition has a rate of flow about 0.3–0.4 inch in 10 seconds. Similarly, the use of pressures of 1–10 lbs./sq. in. requires rates of flow greater than about 0.4 inch in 10 seconds.

As stated, the number of plasticizers or plasticizing resins which are suitable components of the heat and pressure sensitive side of our composite film is large. A few examples of these modifiers are: p-toluene sulfonanilide, butyl-phthalyl butyl glycollate, diphenyl mono-xenyl phosphate, mono-phenyl di-xenyl phosphate, diphenyl phthalate, chlorinated diphenyl, a toluene sulfonamide-formaldehyde resin known commercially as "Santolite M. H. P.", a modified alkyd resin known commercially as "Amberlac B. 94", an oil modified alkyd resin known commercially as "Paraplex R. G. 2", a urea-formaldehyde resin known commercially as "Uformite F. 225". These, or other modifiers, may be used singly or in admixture one with the other. They are added to the high ethoxy, low viscosity type ethyl cellulose in amount sufficient to give the desired rate of flow as defined above.

For the harder side of our composite film, any organo-soluble ethyl cellulose may be utilized, but we prefer to use material of viscosity type as defined above of greater than about 30 centipoises, as such material gives a mechanically stronger film than low viscosity type ethyl cellulose. Further, we prefer to use ethyl cellulose of ethoxyl content equal to, or less than, 46 per cent, as this is normally stronger and harder than high ethoxy ethyl cellulose of the same viscosity characteristics, and can be cast into thinner films. These films form a unitary bond with low viscosity type, plasticized, high ethoxy ethyl cellulose laminae when joined in one of the ways to be described in the following.

A number of general methods of forming our unitary, transparent composite films are available. Four such methods are now described, but these should not be looked upon as limiting the scope of the invention.

(1) A solvent-wet film of ethyl cellulose of viscosity type above 30 centipoises is laid down from an extrusion hopper on to a travelling surface. After a short interval, a second film of plasticized, high ethoxy, low viscosity type ethyl cellulose composition is deposited on the first from another hopper and the solvent-wet composite film is dried. It is preferred to use this method when making composite films, both sides of which comprise high ethoxy ethyl cellulose, as in this case the solvents in the two casting dopes will be the same. This fact causes intermingling of the dopes in the vicinity of the common surface, giving excellent bond. On drying, the components of the two sided film cannot be separated and form a truly unitary product, the two surfaces, however, differing markedly in properties.

(2) Two separately fabricated films, one consisting of ethyl cellulose alone and the other containing plasticizer, are united by any of the usual heat lamination procedures such as passing the article between heated rollers or pressing between heated plates.

(3) A solution of plasticized, low viscosity, high ethoxy ethyl cellulose is spread on a dry, unplasticized ethyl cellulose film by one of the known roller coating methods.

(4) A solution of plasticized, low viscosity, high ethoxy, ethyl cellulose is sprayed onto the surface of an unplasticized ethyl cellulose film.

The thickness of composite film required will govern to some extent the choice of one or the other of the above methods of manufacture. Thus, the spray or roller coating method is capable of yielding a much thinner plasticized lamina than methods (1) or (2). In the latter processes, the lower limit of thickness will be of the order of 0.0005 inch, while in the former thickness of about 0.0001 inch is feasible. The thickness of the unplasticized base lamina will in all cases be limited by the requirement that it shall be self-supporting. It will normally be thicker than about 0.0004 inch.

For uniting our composite films to the surfaces of objects, several methods are available. Thus, for joining the films to paper or similar sheet material, passage between heated rollers or pressing between heated plates may be used. Those films which become adhesive at low pressures, i. e. less than about 20 lbs./sq. in. at 125° C., may be bonded to sized, heavily printed paper by the use of a simple device consisting of a belt of fabric, leather, or other composition, which passes over a heated, polished cylinder. The paper to be coated and the composite film, having its plasticized face adjacent to the paper, is fed between the belt and cylinder, the unplasticized face of the film in contact with the latter. The belt is adjusted so that it presses the paper against the film to yield a firmly, uniformly bonded film-coated paper.

Examples follow which illustrate the practice of the present invention:

EXAMPLE 1

Solids of the following compositions were dissolved in a solvent consisting of 80 parts of toluene and 20 parts of ethanol to form solutions of 20 per cent concentration.

Table

| | Plasticizer | | Ethyl cellulose (10 centipoise, 48 per cent ethoxy) amount |
| --- | --- | --- | --- |
| | Kind | Amount | |
| | | Percent | Percent |
| (a) | Oil modified alkyd | 25 | 75 |
| (b) | p-Toluene sulfonanilide | 35 | 65 |
| (c) | Toluene ethyl sulfonamide | 35 | 65 |
| (d) | Toluene sulfonamide-formaldehyde | 35 | 65 |
| (e) | Butyl-phthalyl-butyl glycollate | 35 | 65 |
| (f) | Mono-phenyl di-xenyl phosphate | 45 | 55 |
| (g) | Diphenyl phthalate | 35 | 65 |
| (h) | Pentachloro diphenyl | 40 | 60 |

These solutions were cast onto ethyl cellulose film, made from 46 per cent ethoxy material, to give coatings which, on drying, had thicknesses of about 0.0005 in. The composite films thus produced were applied to photographic reproductions under a pressure of 5–10 lbs./sq. in. at 125° C. The laminations in all cases were satisfactory.

EXAMPLE 2

*Colored printed illustrations surfaced with a composite ethyl cellulose film*

For making these printed illustrations, an apparatus comprising a rotatable polished steel drum was used, having a rubber composition belt pressing on its surface. The interior of the drum was fitted with heating units which heated the upper half of the drum surface to a temperature controllable between the limits 250°–350° F. and the lower half of the drum was cooled with cold water. Kraft paper, a sheet of printed illustrations and a composite ethyl cellulose film were fed between the rubber belt and the drum arranged in the order given, the kraft paper contacting the former and the plasticized side of the composite film contacting the face of the illustrations. The composite film used consisted of a base layer of ethyl cellulose of 44 per cent ethoxy content and 0.0006 inch thick, united with a surface layer of plasticized ethyl cellulose composition 0.0005 inch thick containing 70 per cent of ethyl cellulose (ethoxyl content 49.0 per cent), 20 per cent of 4-tertiary-butyl-2-xenyl di-(4-tertiary-butyl-phenyl) phosphate, and 10 per cent of di-xenyl mono-phenyl phosphate.

In one run using the above procedure, the heated portion of the drum was at a temperature of 270° F. and its speed adjusted so that the time of contact of the composite film with the heated portion was 25 seconds. Under these conditions, and using a belt pressure of 1.5 lbs./sq. in., products showing uniform and firm adhesion were obtained.

A similar run using a drum temperature of 320° F. and a time of contact of 5 seconds also gave a satisfactory product. The coated photographic reproductions have the appearance of actual photographic prints with a smooth glossy surface united to the printed paper to produce a truly unitary article whereof the successive layers are: paper, ink, plasticized low viscosity high ethoxy ethyl cellulose adhesive layer, and unplasticized high viscosity, low ethoxy ethyl cellulose protective, abrasion resistant layer.

We claim:

1. A composite article consisting of a supporting surface coated with a protective two-layer film, the exposed surface of the film consisting of ethyl cellulose having a viscosity greater than 30 centipoises and an ethoxy value of from 43 to 46 per cent united to the supporting surface by a co-extensive layer of a heat and pressure sensitive composition of a low viscosity type of ethyl cellulose of ethoxy value from 46.5 to 49.5 per cent plasticized with from 20 to 50 per cent of a softening plasticizer sufficient to make the composition flowable under a pressure of from 1 to 80 pounds per square inch at temperatures between 75° and 150° C., but insufficient to make the composition tacky at room temperature.

2. A unitary composite film having a base consisting of ethyl cellulose having a viscosity greater than 30 centipoises and an ethoxy value 43–46 per cent to which is bonded a layer comprising a composition of a low viscosity type ethyl cellulose of ethoxy value 46.5–49.5 per cent and a softening plasticizer in amount ordinarily in the range from 20 to 50 per cent, sufficient to make the composition flowable under a pressure of from 1 to 80 pounds per square inch and at temperatures between 75° and 150° C., but insufficient to make the composition tacky at room temperature.

3. A unitary composite film as defined in claim 2, wherein the non-tacky, plasticized layer contains ethyl cellulose of viscosity type below 25 centipoises.

DONALD L. GIBB.
ALBERT B. SAVAGE.